United States Patent [19]

Wood

[11] Patent Number: 4,680,066
[45] Date of Patent: Jul. 14, 1987

[54] LINING OF PIPELINES OR PASSAGEWAYS

[75] Inventor: Eric Wood, Northants, England

[73] Assignee: Insituform Group Limited, Isle of Man

[21] Appl. No.: 754,722

[22] Filed: Jul. 15, 1985

[30] Foreign Application Priority Data

Jul. 13, 1984 [GB] United Kingdom ............... 8418038

[51] Int. Cl.$^4$ ............................................. B32B 31/12
[52] U.S. Cl. .................................... 156/156; 156/285;
156/286; 156/287; 156/294; 156/303.1;
156/275.5; 264/259; 264/262; 264/263;
264/267; 264/270; 264/523; 264/566
[58] Field of Search .................... 156/155–156,
156/244.13, 285, 287, 289, 293–294, 303.1,
275.7, 244.14, 272.2, 275.5; 264/267–270, 566,
571, 250, 259, 261–263, 500, 512, 515, 523, 339,
285; 138/143, 141, 97, 176, 199; 285/55, 45

[56] References Cited

U.S. PATENT DOCUMENTS

| 3,307,996 | 3/1967 | Keneipp, Jr. | 156/294 |
| 4,074,008 | 2/1978 | Green | 156/634 |
| 4,135,958 | 1/1979 | Wood | 156/294 |
| 4,325,772 | 4/1982 | Suetoshi | 156/295 |
| 4,379,039 | 4/1983 | Fujimoto | 156/352 |
| 4,581,085 | 4/1986 | Wood | 156/156 |
| 4,581,247 | 4/1986 | Wood | 427/53.1 |
| 4,602,974 | 7/1986 | Wood et al. | 156/287 |

Primary Examiner—Donald E. Czaja
Assistant Examiner—Merrell C. Cashion, Jr.
Attorney, Agent, or Firm—Fred Philpitt

[57] ABSTRACT

The invention provides for the light curing of a synthetic resin which is light curable, and is arranged as a layer upon the surface of a pipeline or passageway. The curing lamps are enabled to be pulled into the pipeline or passageway by virtue of inserting a tubular member into the passageway which is inflatable by fluid pressure so as to hold the resin layer in position. The lamps pass through the inflatable tubular member so that radiation therefrom will fall on the layer of resin and cure or initiate the cure of the same.

10 Claims, 4 Drawing Figures

LINING OF PIPELINES OR PASSAGEWAYS

This invention relates to the lining of pipelines or passageways with a tubular liner and a curable synthetic resin.

There is aready disclosed in European Patent Application No. 84116350.4 that the resin is of a composition so that it is curable (or polymerisable) by means of light energy, and when the lining, which is flexible before being applied to the passageway surface, but becomes rigid when the resin cures, is subjected to light energy whilst held in position lining the passageway, the cure of the resin is commenced and/or effected.

In accordance with the invention there is provided a method of lining a pipeline or passageway comprising moving a flexible tubular lining into the pipeline or passageway and using a fluid pressure differential to shape the tubular lining to the passageway surface, there being a light curable synthetic resin sandwiched between the inner surface of the lining and the passageway surface to define a hard pipe lining the passageway surface when cured, characterised in that a means is attached to the lining tube when it is moved into the pipeline or passageway enabling curing light source means to be pulled into the passageway in order to effect curing of the resin.

The lining may comprise one or more layers of resin absorbent material such as fibrous felet which is or are impregnated with the resin, and the resin may be applied to the resin absorbent material layer or layers inside or outside the passageway.

Alternatively the resin may be applied to the passageway surface and may be held thereto by the subsequent application of the tubular liner, which may be in the form of a thin tubular membrane, inverted into the passageway immediately following the application of the resin to the passageway surface. The application of the resin to the passageway surface may be by any suitable means, such as spraying or painting.

The lining may be simply pulled into the passageway and then inflated using the fluid pressure differential or it may be inverted by said fluid pressure differential into and along the passageway.

The fluid pressure differential may be created by liquid and/or gaseous medium as required.

The said means may comprise a rope cable or the like which is attached to one end of the lining and which can be used for applying a restraining effect on the end of the lining when the lining is inverted, or in an alternative arrangement, to the end of the lining is attached a pulley forming said means, and the hold back rope trains round the pulley to provide two operative reaches of the rope. When the lining is in position with this alternative embodiment, the rope is pulled round the pulley so that one reach is removed from the passageway, and the other reach feeds round the pulley. To the said other reach there may be attached the light source means which are pulled in so as travel along the inside of the lining in the passageway effecting the cure.

The light source means may be kept in position essentially centrally of the passageway by means of ballast weights and/or floats or any other suitable means.

The light source means may comprise one or more light source units comprising high intensity filaments located in a vacuum casing, the casing being contained in a protective and transparent outer casing, the units being sealed permitting the light source means to be used under water. Suitably, the lights may be high pressure metal halide lamps having pinched ends and they may be a wavelength of the order of 350 to 450 nanometers.

In the majority of cases, where the lining is everted, it will be everted using water, but in some cases the lining is everted by air or a combination of air and water. Where air only is used, in accordance with another of our inventions, it is preferred that a lubricant be placed in the base of the passageway to enable the lining to slip over same.

In addition to the hold back rope, there may also be a pull through cord, tape or the like which is located in the inside of the lining prior to inversion, so that the cord emerges from the inversion face, and tension can be applied thereto in order to assist the inversion process as necessary.

The lining preferably comprises before insertion in the passageway one or more layers of fibrous felt, with the outside of the layer or the outside of the outermost layer provided with a fluid impermeable coating. The fibres of the felt and the resin are preferably selected so that they have a combined refractive indiex making the combined material substantially transparent to the specific wave length light which is used for the curing process whereby the light will penetrate completely through the lining in order to effect cure through the entire thickness of the lining. The lining may be any thickness but typically will be between 2 mm and 25 mm.

Various embodiments and aspects of the present invention will now be described, by way of example, with reference to the accompanying drawings, wherein.

Figure 1:
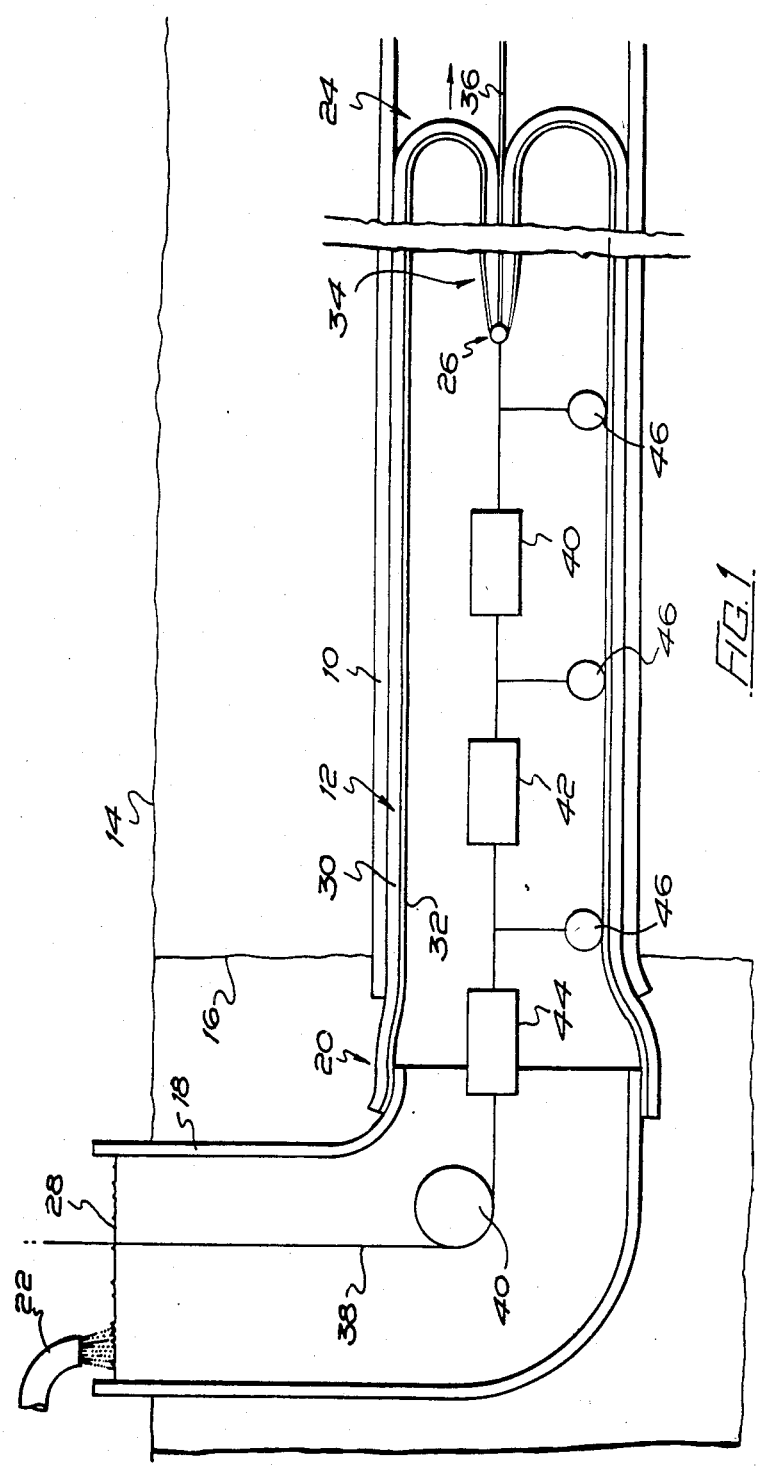
FIG. 1 is a sectional side view illustrating the lining process for an underground passageway and embodying an aspect of the present invention.

Referring to the drawings, and firstly to FIG. 1, in this figure is shown an underground pipe 10 which is in the process of being lined with a liner 12 of flexible material. The pipe 10 is located under the ground level 14, and the liner is being inserted through a manhole 16, by means of an elbow feeding pipe 18. An end 20 of the liner is fixed to the open end of the elbow pipe 18 located in the bottom of the manhole, and then water is poured into the elbow pipe 18 as indicated by the spout 22, so as to cause the liner 12 to evert into and along the inside of the pipe 10, as illustrated at the everting region 24. The trailing end of the liner is illustrated at point 26, and the liner feed is maintained by keeping a constant head 28 of water in the elbow pipe 18.

The liner 12 is made up of a layer 30 which is of resin absorbent material such as fibrous material in woven or felted form, or in any suitable combination, and an inner membrane 32 which is impermeable to fluids. The layer 30 is impregnated with a curable resin material, such as polyester resin or the like, and it will be observed that initially the membrane 32 is to the outside of the liner before inversion as shown in the region 34, but becomes the inner layer after the lining is applied to the inside of the pipe 10, and to resin lies between the inner surface of the liner and the passageway surface. The lining which is flexible until the resin carried thereby is cured is tailored to the size of the pipe 10 to be lined, and the trailing end 26 eventually emerges in another manhole, similar to manhole 16 but spaced therefrom, and after curing the protruding end is cut off to complete the lining operation.

Two ropes or cables may be used in connection with the lining operation, these ropes or cables having different functions. A first rope or cable 36 is a "pull through" rope which can be used to help to pull through the everting portion of the liner in the event of need, whilst the other rope or cable 38 is a "hold back" rope which is attached to the point 36, and is trained round a guide roller 40 in the elbow 18, and serves to prevent the trailing end 26 of the liner from travelling along the inside of the passageway too quickly.

In accordance with an aspect of this invention, the resin which impregnates the layer 30 (and is normally applied in the factory prior to taking the lining to the site) contains a photo-initiator so that the resin system as a whole will be light curing, and in the arrangement shown in FIG. 1 a bank of illumination source assemblies 40, 42 and 44 are connected in the hold back rope 38, these sources being maintained at least approximately centrally of the pipe 10 by means of ballasting weights 46. As the lights travel through the interior of the everted lining, so the illumination radiating therefrom will initiate the curing of the resin in the layer 30. The resin system and the photoinitiator are preferably chosen so that only certain wave lengths will initiate the cure, and it is also desirable to choose the layer 30 to be of fibres which, when immersed in the resin system, provide a layer which is of a refractive index so that the layer is in fact substantially transparent to the light of those wave lengths which can initiate the cure. This is to ensure that the light will penetrate through the interior thickness of the layer 30 to give effective curing. The membrane 32 is also selected to be transparent to light up the aforesaid wave lengths.

The advantage of using photo initiated resin systems is that these systems will remain liquid for many months as long as they are not exposed to light of the appropriate wave lengths, and therefore liners can be impregnated well in advance of the time of use. Conventional resin systems which cure under the reaction of heat or at ambient temperatures will harden in a few days even if refrigerated.

The hold back rope 38 which may be a multi-core cable will incorporate all of the necessary electrical conductors and ignitors for controlling and powering the bank assemblies 40, 42 and 44. As soon as the lamps (when lit) start travelling along the inside of the pipeline, the resin systems start to cure. The speed of inversion of the lining is controlled so that full and even curing takes place.

Figure 3:
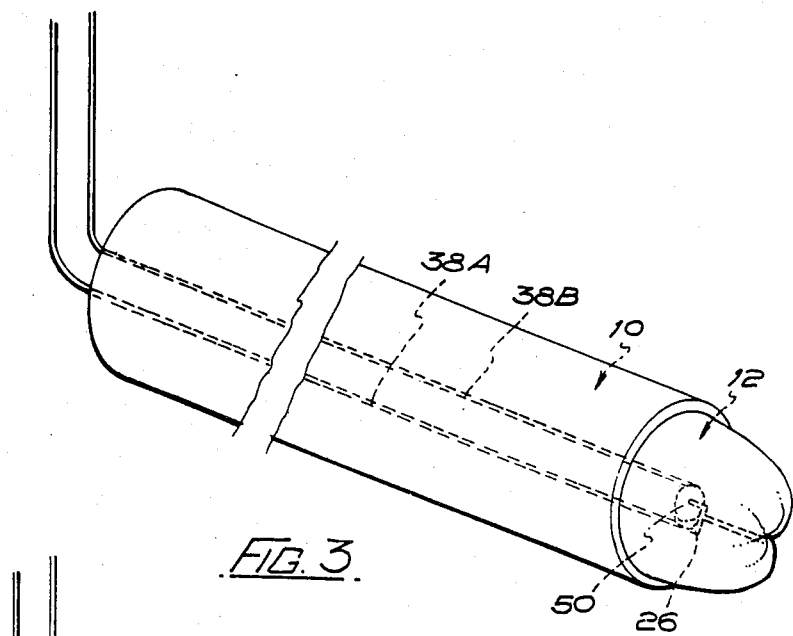
FIG. 3 illustrates diagrammatically and in perspective view a method of lining an underground pipeline or passageway in accordance with another aspect of the invention.
Figure 4:
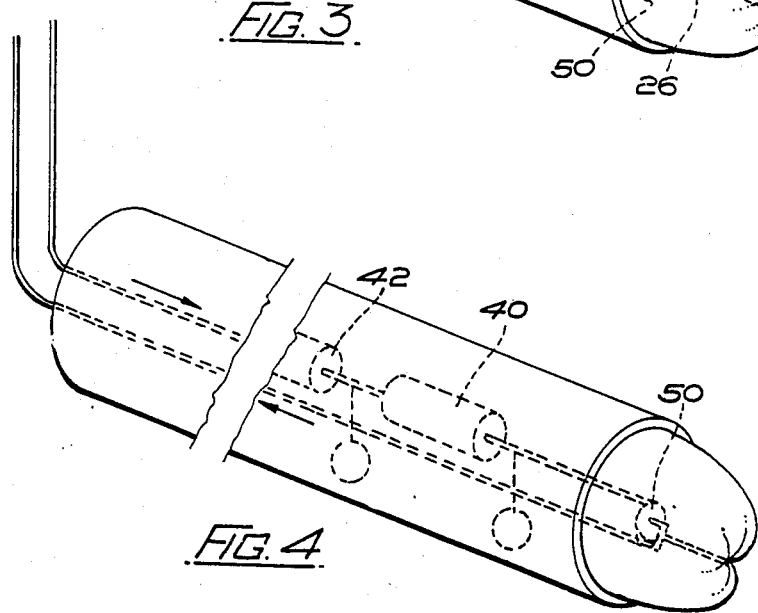
FIG. 4 illustrates in a view similar to FIG. 3, a subsequent step in the lining process illustrated in FIG. 3.

FIGS. 3 and 4 illustrate an alternative method for a lining operation, but parts already described have the same reference numerals. As shown in FIG. 4, the trailing end 26 of the lining 12 is attached the pulley 50, and trained round the pulley is the pull back cable 38 defining two reaches 38A and 38B. These two reaches control the inward inversion of the lining, but at the end of the inversion, as shown in FIG. 4 the reaches are fed round the pulley 50, and attached to the end of one reach is the bank of light assemblies 40, 42 and 44, so that in fact these assemblies (when lit) are pulled through at a controlled speed after the eversion process has been completed.

Figure 2:
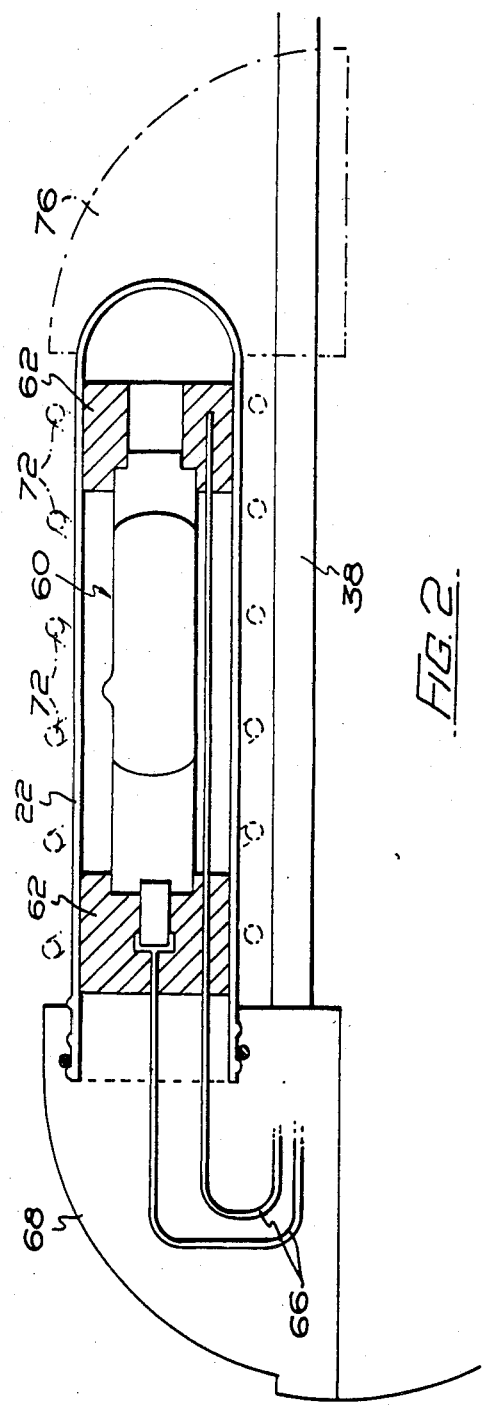
FIG. 2 is sectional elevation of one unit of the light source means used in the process of FIG. 1.

It should be borne in mind that the light assemblies in the embodiments described are pulled through a body of water inside the everted lining, and therefore the light units of the assemblies must be waterproof in nature. FIG. 2 shows one arrangement which has been found suitable for each light unit, and referring to FIG. 2 a light unit is shown in sectional elevation. This is a high intensity metal halide lamp which provides a convenient light source. Because such a lamp requires a high operating temperature it is protected from the water by sealing the lamp in an outer tube of glass or quartz, and appropriate provision is made to conduct heat from the ends of the lamp as it must be kept relatively cool. In FIG. 2, the lamp is indicated by numeral 60 and is mounted by its ends within metal mounting blocks 62. These blocks are of metal such as aluminium in order to serve not only as conductors but also as heat drains to drain heat away from the lamp 60. The electric conductors 66 of the lamp 60 pass through a connector 68 which sealingly receives the screwed end of an outer transparent tube 72 which is optionally protected by a wire screen 74 and which is nitrogen filled. The screen is made up of individual strands which extend helically relative to the casing 72 in order to avoid the casting of linear shadows on the pipeline as the light assemblies pass down the inside of the liner during the curing operation. The casing 72 is a closed end tube and the closed end may, as shown in dotted lines, be supported by a mounting 76. The mountings 68 and 76 have the shape shown to protect the lamp assembly from being impacted as it is being drawn into and out of the passageway. The mounting 68 will be filled with sealing compound to waterproof the connecting lead 66 which couple with the multi-core cable 38.

In the arrangement described with reference to the drawings, the lining comprises resin absorbent felt layers, which may be of acrylic or polypropylene fibres, and the tube is dimensioned to the size of the passageway to be lined, so that it will experience a minimum stretch. However it is within the scope of the invention to provide flexible tubes which are stretchable or non-stretchable.

Furthermore, the flexible tubes forming linings may be simply pulled into the pipeline or passageway and then inflated herein fluid pressure of air or water or a combination of air and water. The resin may be applied to the absorbent layers either before the lining is introduced into the passageway or after it has been introduced into the passageway and indeed as it is being applied to the passageway surface.

In another arrangement, a layer of the curable resin is applied to the passageway surface for example by a rotary spray or the like, and this is followed immediately by an everting flexible tubular liner which retains the resin in position lining the surface until it is cured by the lights as described herein.

The specific curing light arrangement illustrated in FIG. 2 is a novel construction, and constitutes an invention in its own right, the applicant reserves the right to file any divisional patent applications or claims in respect thereof.

A suitable light curing resin which can be used in the process of the present invention is a polyester resin including photo initiator.

It has been found that by using light energy to cure the resin, the total energy required for curing is of the order of 1% of that required when curing is achieved by inserting hot water into the inside of the everted liner.

I claim:

1. In the method of lining a pipeline or passageway with a flexible tubular liner that includes introducing into said pipeline or passageway a liner comprising an inner tube of resin absorbent material and an outer membrane impervious to fluids, everting said liner during its travel through said pipeline or passageway so that when everted said tube of resin absorbent material is pressed outwardly against the inner surface of said pipeline or passagewy and said impervious membrane is disposed inwardly of said everted tube of resin absorbent material, said resin absorbent material being saturated with a light curable resin prior to or after its eversion, and introducing light curing means into the interior of said everted liner to thereby cure said light curable resins, the improvement which comprises controlling the movement of said light curing means through said everted liner by attaching said light curing means to the trailing end of the liner that will be the last to be everted.

2. The method of claim 1 wherein the eversion of said liner is assisted by attaching a rope or cable to the trailing end of said liner and exerting a pulling force on it from a point in advance of the everting liner.

3. The method of claim 1 wherein a fluid is introduced into said liner to assist in eversion.

4. A method according to claim 1 wherein said light curing means comprises at least one light in the form of a high pressure metal halide lamp contained in a transparent envelope isolating the lamp from contact with a surrounding environment.

5. A method according to claim 1 wherein the liner is inserted by inversion using water and the light curing means is pulled through the water to effect curing of the resin.

6. In the method of lining a pipeline or passageway with flexible tubular liner that includes introducing into said pipeline or passageway a liner comprising an inner tube of resin absorbent material and an outer membrane impervious to fluids, everting said liner during its travel through said pipeline or passageway so that when everted said tube of resin absorbent material is pressed outwardly against the inner surface of said pipeline or passageway and said impervious membrane is disposed inwardly of said everted tube of resin absorbent material, said resin absorbent material being saturated with a light curable resin prior to or after its eversion, and introducing light curing means into the interior of said everted liner to thereby cure said light curable resin, the improvement which comprises attaching rope and pulley means to the trailing end of the liner that will be the last to be everted, said rope and pulley means being located within the everting liner and being connected to said light curing means so that the movement of said rope around said pulley will control the movement of the light curing means along the length of said everting liner.

7. The method of claim 6 wherein the eversion of said liner is assisted by attaching a rope or cable to the trailing end of said liner and exerting a pulling force on it from a point in advance of the everting liner.

8. The method of claim 6 wherein a fluid is introduced into said liner to assist in eversion.

9. A method according to claim 6 wherein said light curing means comprises at least one light in the form of a high pressure metal halide lamp contained in a transparent envelope isolating the lamp from contact with a surrounding environment.

10. A method according to claim 6 wherein the liner is inserted by inversion using water and the light curing means is pulled through the water to effect curing of the resin.

* * * * *